Figure 1:
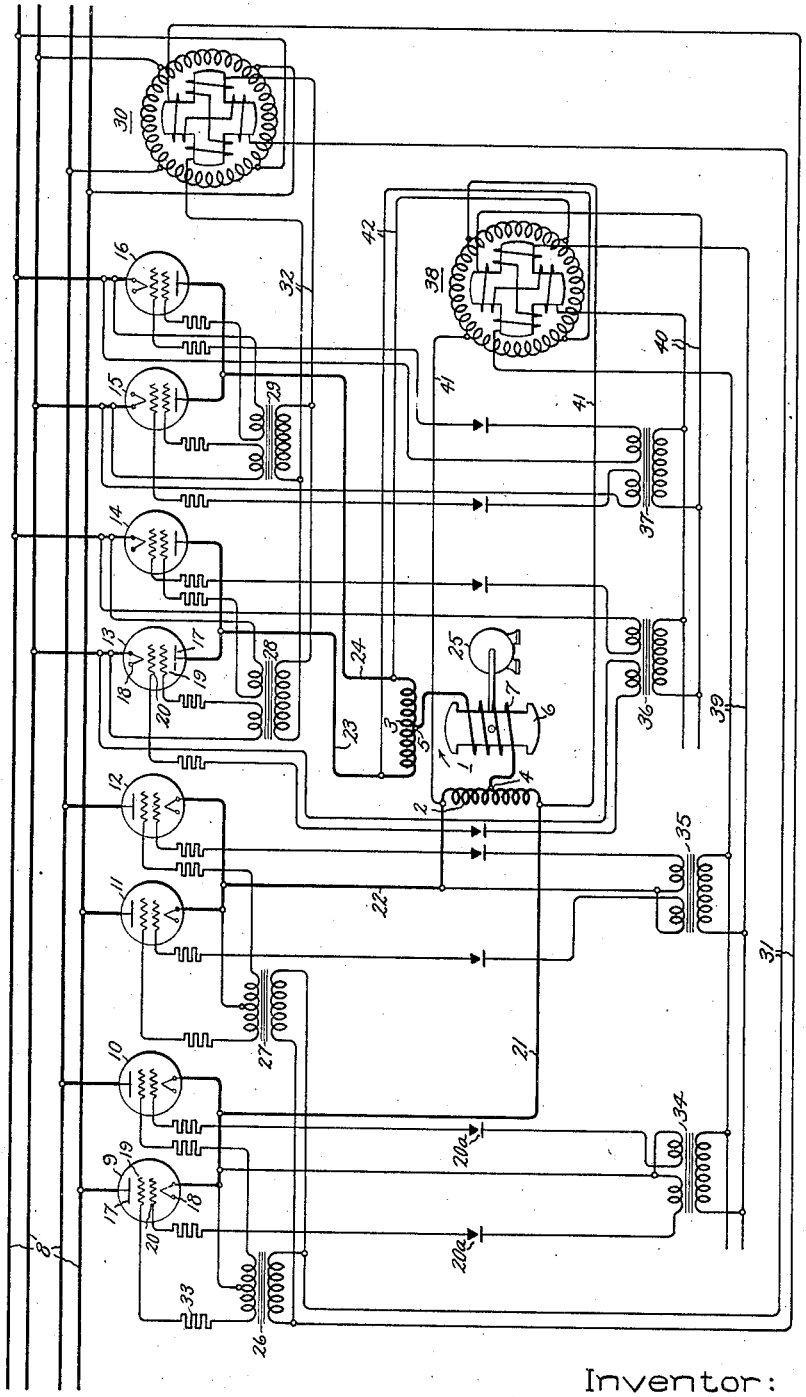

June 28, 1938.  E. F. W. ALEXANDERSON  2,122,271
ELECTRIC VALVE CONVERTING SYSTEM
Filed Feb. 29, 1936   4 Sheets-Sheet 1

Inventor:
Ernst F. W. Alexanderson,
by Harry E. Dunham
His Attorney.

Inventor:
Ernst F. W. Alexanderson,
by Harry E. Dunham
His Attorney.

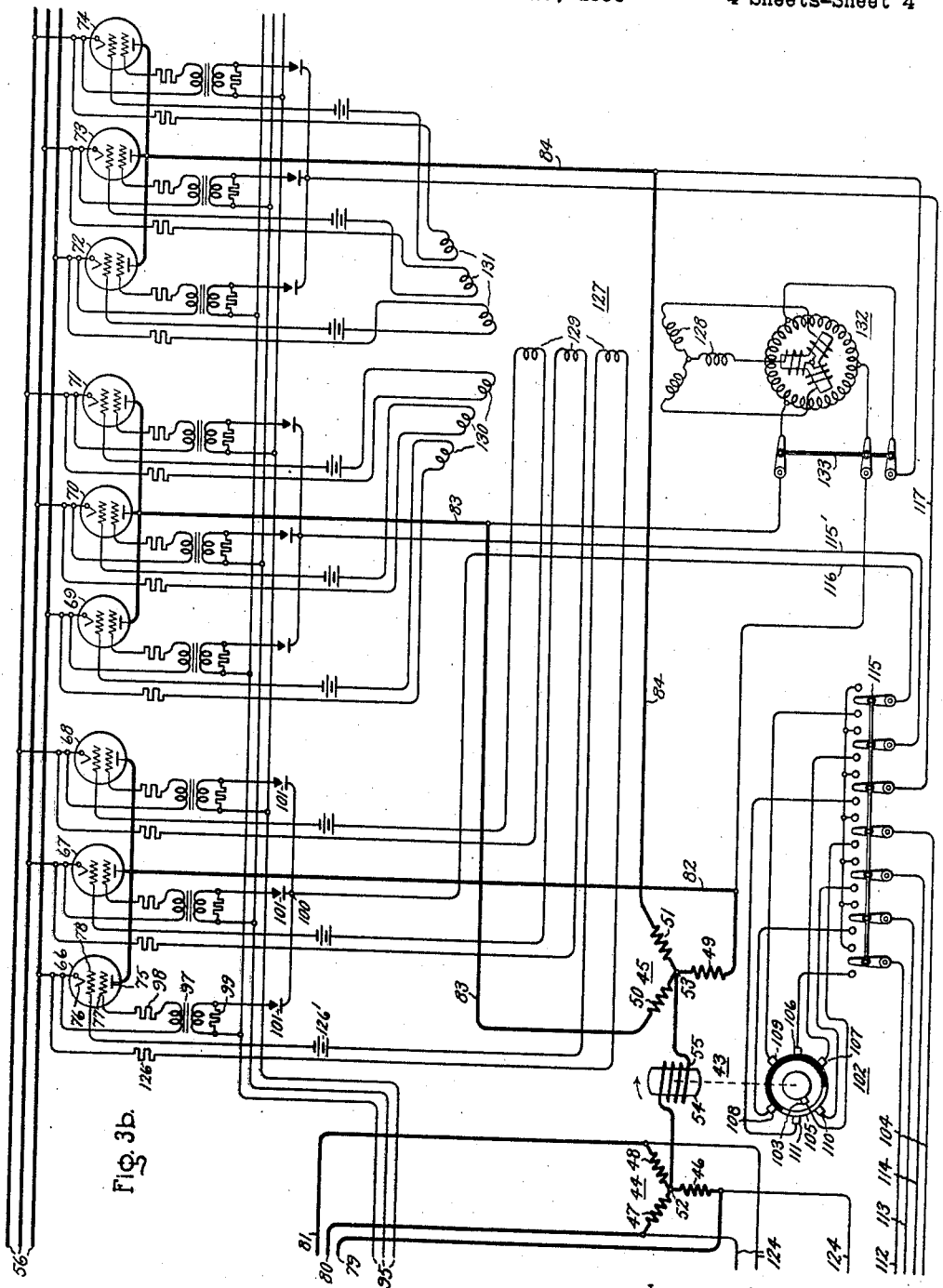

Patented June 28, 1938

2,122,271

UNITED STATES PATENT OFFICE 2,122,271

ELECTRIC VALVE CONVERTING SYSTEM

Ernst F. W. Alexanderson, Schenectady, N. Y., assignor to General Electric Company, a corporation of New York Application February 29, 1936, Serial No. 66,432

27 Claims. (Cl. 172—274)

My invention relates to electric valve converting systems, and more particularly to such systems adapted to transmit energy from an alternating current supply circuit to a variable frequency alternating current load circuit or device, such as, for example, an alternating current dynamo-electric machine.

Heretofore there have been devised numerous electric valve frequency changing systems for transmitting energy from an alternating current supply circuit to a variable frequency alternating current load circuit. Coincidently therewith there have been developed numerous arrangements for controlling the systems to effect the desired operation of the electric valve systems. Many of the control or excitation circuits for the main or power electric valves have involved apparatus complicated in arrangement and intricate in operation. Generally, the prior art arrangements employed have involved the use of auxiliary equipment of inordinate proportions to obtain the periodic energization of the associated main electric valve means. In such arrangements it has been found preferable to use electric valve means of the gaseous type for the power valves because of the relatively large amounts of energy which may be handled at ordinary operating voltages. The vapor electric valves previously used in electric valve frequency changing systems have employed a single control member associated with each unidirectional conducting means or rectifier. For example, where individual vapor electric valves have been used, a single control member or electrode has been co-operatively associated with the anode and cathode of the valves to effect the desired periodic energization of the valves. In view of these arrangements, it has been essential that the control member of the main power electric valve be energized by means of complicated excitation circuits which are responsive to a number of different electrical conditions to obtain the desired periodic energization. Furthermore, when utilizing such apparatus for operating an alternating current motor at variable speed, it is preferable that the excitation or control circuits be simple in arrangement and operation to assure certain and reliable performance.

It is an object of my invention, therefore, to provide an improved electric valve converting system for transmitting energy from an alternating current supply circuit to an electric translating apparatus which obviates the above-mentioned undesirable features of the prior art arrangements and which will be simple and reliable in operation.

It is another object of my invention to provide an improved electric valve converting system and method of operation thereof for transmitting energy between alternating current systems of the same or different frequencies.

It is a further object of my invention to provide an improved electric valve converting system for transmitting energy between an alternating current circuit and a variable frequency alternating current circuit by means of improved and simplified control apparatus.

It is a still further object of my invention to provide an improved control circuit for electric valve translating apparatus.

In accordance with the illustrated embodiments of my invention, an alternating current supply circuit is interconnected with an electric translating apparatus comprising a plurality of phase windings such as, for example, a polyphase alternating current motor, through a plurality of electric valves. One group of electric valves interconnects the supply circuit with one of the phase windings and all the valves of this group are connected with the same polarity with respect to the alternating current circuit. In a similar manner, another phase winding of the translating apparatus is connected to the supply circuit through a second group of valves, all connected with opposite polarity with respect to the supply circuit, and an interconnection is provided between the various phase windings. In order selectively to control the energization of the various phase windings in a predetermined sequence in accordance with predetermined electrical conditions, such as the voltages of the supply circuit and the phase windings, I use electric valve means having a plurality of arc paths and control members therefor, such as a plurality of individual electric valves of the gaseous type each having an anode, a cathode, and at least two control members. By the term "electric valves of the gaseous type" I intend to include electronic discharge devices employing ionizable mediums such as gases or vapors. A voltage which varies in accordance with one of the electrical conditions, such as the voltage of the supply circuit, is impressed on one of the control members, and a voltage which varies in accordance with a different electrical condition, such as the voltage of the associated phase winding, or a voltage timed in accordance with the mechanical portion of the rotor of the motor, is impressed on the other control member. The individual electric valves are constructed and arranged so that either of the control members may maintain the valve nonconductive by impressing a voltage sufficiently negative in polarity on that member. Conversely, the valves are rendered conductive if suitable voltages are impressed concurrently on both control members. In this manner, I provide an improved and simplified electric valve translating circuit.

For a better understanding of my invention, together with other and further objects thereof, reference may be had to the following description taken in connection with the accompanying drawings and its scope will be pointed out in the appended claims.

Figure 2:
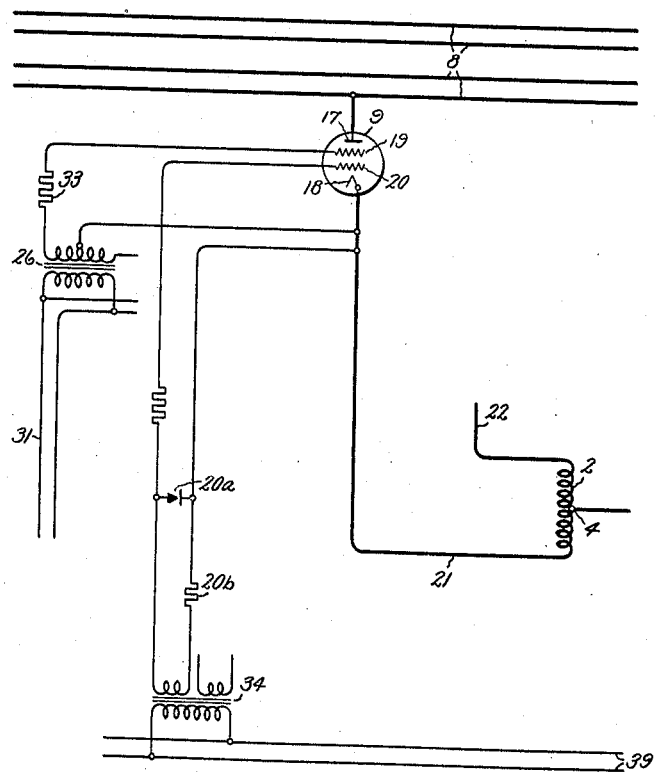
Figure 3A:
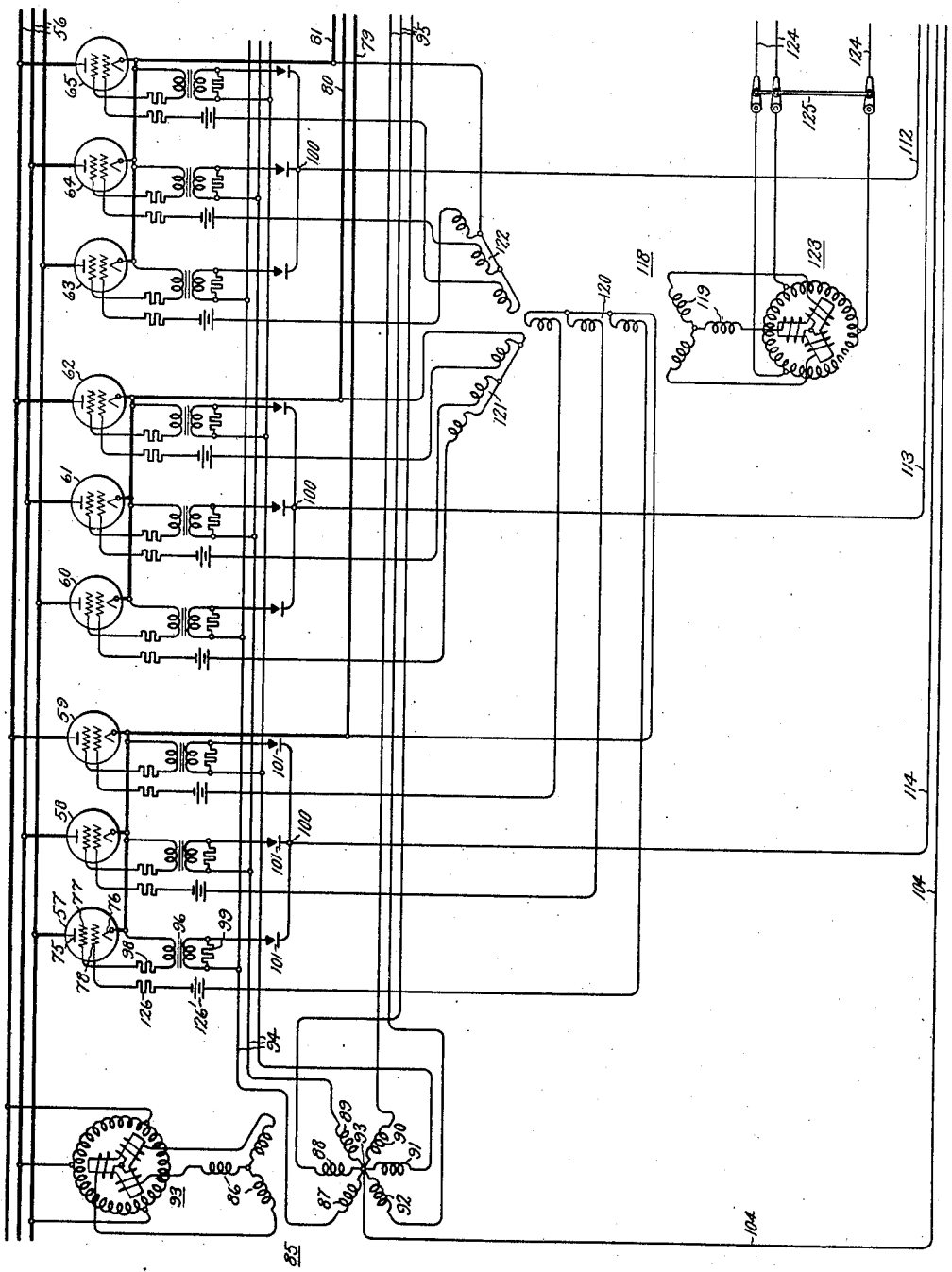

In the drawings, Fig. 1 diagrammatically represents an arrangement embodying features of my invention for transmitting energy from a quarter phase alternating current supply circuit to a quarter phase alternating current motor of the synchronous type. Fig. 2 diagrammatically illustrates a modified excitation circuit for controlling the conductivity of electric valves employing two control members. Figs. 3a and 3b, considered conjointly, diagrammatically show an embodiment of my invention for transmitting energy from a three phase alternating current supply circuit to a three phase alternating current motor of the synchronous type.

Referring now to Fig. 1 of the accompanying drawings, one embodiment of my invention is diagrammatically illustrated as applied to an electric valve translating system. The general features of this system are disclosed and broadly claimed in United States Letters Patent 1,937,377, granted November 28, 1933, on my application and assigned to the assignee of the present application. In the arrangement diagrammatically shown in Fig. 1, a quarter phase alternating current motor 1 of the synchronous type having inductive phase windings 2 and 3 having electrical neutrals 4 and 5, respectively, a rotor 6, and an inductive field winding 7, is energized from terminals of the quarter phase alternating current circuit 8 through electric valves 9–16, inclusive, preferably of the gaseous type. Each of the electric valves 9–16 has an anode 17, a cathode 18 and control members 19 and 20. Connected in series with the control members 20 for each of the electric valves 9–16 is a rectifier 20a, illustrated as of the contact type, which suppresses the positive half cycles of alternating potential appearing across the secondary windings of transformers 34–37. This excitation circuit is disclosed and broadly claimed in a copending application of J. H. Foley, Serial No. 66,380, filed February 29, 1936, and assigned to the assignee of the present application. The pair of electric valves 9 and 10 are connected to a terminal of one phase of the quarter phase circuit 8 and periodically supply unidirectional current to a terminal of the lower half of phase winding 2 through a conductor 21, and the pair of valves 11 and 12 are connected to the same phase of the circuit 8 and periodically furnish unidirectional current to the upper half of phase winding 2 through a conductor 22. These currents are returned to the other phase of supply circuit 8 by means of the oppositely disposed pairs of electric valves 13 and 14, and 15 and 16 which are in series relation to the first-mentioned valves and are connected to the left-hand and right-hand halves of phase winding 3 through conductors 23 and 24, respectively. Any suitable auxiliary means, such as a motor 25, may be used to start the rotor 6.

To control the conductivity of the electric valves 9–16 in accordance with electrical conditions such as the voltage of the supply circuit 8, I provide transformers 26–29 which are energized from the supply circuit 8 through any conventional phase shifting arrangement such as the quarter phase rotary phase shifting device 30 which is connected to the transformers 26 and 27, and 28 and 29 through conductors 31 and 32, respectively. By means of transformers 26–29, which may be of the type for supplying a voltage of peaked wave form, voltages are impressed on the respective control members 19 of valves 9–16 to control the conductivity of the valves in accordance with the voltage of the associated phase of the supply circuit 8. Suitable current limiting resistances 33 are connected in series with secondary windings of transformers 26–29 and the control members 19.

The conductivity of each of the electric valves 9–12, and 13–16 is also controlled in accordance with the voltages of phase windings 2 and 3 of motor 1 by means of transformers 34–35 and 36–37, respectively, which impress voltages on the control members 20 which vary in accordance with the voltages of the associated phase windings. These transformers are energized from the phase windings 2 and 3 through any conventional phase shifting arrangement such as the rotary phase shifter 38 and through conductors 39 and 40. The phase shifter 38 is connected to phase windings 2 and 3 through conductors 41 and 42.

In explaining the operation of the embodiment of my invention shown in Fig. 1, let it be assumed that the supply circuit is energized at any desired frequency, preferably at some commercial frequency, and let it be assumed that the speed of the motor 1 is at approximately half-synchronous speed. Let it also be assumed that the rotary phase shifting device 30 is adjusted so that the phase of the alternating voltages impressed upon the control members 19 of electric valves 9–16 will be retarded relative to the anode potentials of these valves to reduce the average voltage impressed upon the armature of phase windings 2 and 3. Under the assumed conditions, the electric valve translating apparatus will operate as a frequency changer selectively to energize the phase windings 2 and 3 relative to the rotation and angular position of the rotor 6.

Considering the operation of the system when the rotating member 6 of motor 1 is in the position shown in Fig. 1, electric valves 11 and 12 operate as controlled rectifiers to supply unidirectional current to a load circuit which comprises the conductor 22, the upper portion of phase winding 2, field winding 7, the right-hand portion of phase winding 3, the current returning through conductor 24 and electric valves 15 and 16 to the other phase of the supply circuit 8. It will be further assumed that with these portions of the armature phase windings 2 and 3 energized, the magnetomotive forces coincident therewith will produce a torque on the rotor 6 to accelerate it in the direction indicated by the arrow. When the rotor member 6 has turned through substantially ninety mechanical degrees, assuming a two-pole motor, the voltages impressed on control members 20 of electric valves 9–16 by transformers 34–37 from phase windings 2 and 3 will have changed to render valves 9 and 10, and 13 and 14 conductive, and electric valves 11 and 12, and 15 and 16 will be rendered nonconductive. Under these conditions, the phase of the magnetomotive force of the motor 1 is advanced ninety electrical degrees so that the rotor 6 is again in maximum torque producing position with respect to the motor magnetomotive force. In this latter position, valves 9 and 10 conduct unidirectional current to a load circuit comprising conductor 21, the lower portion of phase winding 2, field winding 7, the left-hand portion of phase winding 3, conductor 23 and valves 13 and 14. In this manner, the current is successively transferred or commutated between the various portions of the phase windings 2 and 3 to produce a rotation of the magnetomotive force of the motor and thus of the rotating member 6. With this arrangement, it will be noted that under any conditions current will be supplied to only those portions of the phase windings which are in torque producing position with respect to the rotor and that the motor will accelerate at a rate dependent upon the connected load. By advancing the phase of the alternating voltages impressed on the control members 19 of valves 9—16 with respect to the anode potentials, it will be understood that the average voltage supplied by each valve is increased effecting thereby an increase in the speed of the motor. This type of motor is structurally an alternating current synchronous motor having direct current series motor operating characteristics.

This selective energization of the several portions of phase windings 2 and 3 in response to the voltages of supply circuit 8 and the voltages of phase windings 2 and 3 is accomplished by means of the co-operative relationship between the control members 19 and 20 of each of electric valves 9–16, inclusive. The conductivity of each of the valves is conjointly controlled by the associated control members or electrodes 19 and 20. By virtue of the copper oxide rectifiers 20a, the positive half cycles of potential appearing across the secondary windings of the grid transformers 34–37, inclusive, are suppressed. Therefore, the negative half cycles impressed upon the control members 20 serve to maintain the electric valves 9–16, inclusive, nonconductive during predetermined intervals established by the voltage of phase windings 2 and 3 of motor 1. During the alternate half cycles, that is, during the periods in which the positive half cycles of potential would normally be impressed upon the control members 20, the potentials impressed upon the control members 20 are sufficiently positive relative to that of the cathodes 18 to permit the control members 19 to render these valves conductive in accordance with the predetermined electrical condition of the supply circuit 8. The conductivity of each of the electric valves is controlled by the joint electrostatic effect of the control members 19 and 20; that is, either control member may initiate an arc discharge and either control member may hold the electric valve nonconductive if a potential of sufficient magnitude and proper polarity is impressed thereon and if a not too great potential of opposite polarity is impressed on the other control member. For a particular range of control voltages employed, it may be desirable to effect this control by suppressing the positive half cycles of voltage of the control circuit associated with one of the control members, such as control member 20. During certain portions of the positive half cycle of applied anode-cathode voltage when the positive impulses of the circuit for control member 20 are suppressed, the electric valve is maintained nonconductive by a negative potential which is impressed on control member 19. Since the control member 20 is at a potential near zero, which permits control member 19 to render the electric valve conductive, the initiation of the discharge is effected when the potential of the control member 19 reaches the critical value for the particular potential impressed on control member 20. It should be understood that this method of control provides a positive and reliable control for electric valves of the gaseous type employing two or more control members.

While the conductivity of each of the electric valves 9–16, inclusive, in the above described arrangement is controlled conjointly in accordance with the voltage of a constant frequency source and in accordance with the voltage of a variable frequency load circuit, it should be understood that my invention in its broader aspects may be applied to electric valve translating circuits generally where it is desired to obtain control in accordance with a number of predetermined electrical or operating conditions.

Referring now to Fig. 2 of the accompanying drawings, a simplified diagrammatic arrangement of another embodiment of my invention is shown as applied to a single electric valve, such as electric valve 9 shown in Fig. 1 of the accompanying drawings. Corresponding elements have been assigned like reference numerals. The copper oxide rectifier 20a is connected across the terminals of one of the secondary windings of transformer 34 in series with a resistance 20b.

It has been found that the arrangement of Fig. 2 provides a reliable and satisfactory system of control for controlling the conductivity of electric valves of the gaseous type employing two or more motor control members. The copper oxide rectifier 20a or other suitable unidirectional conducting device suppresses the positive half cycle of potential which normally would be applied to the control member 20, permitting the valve to be rendered conductive by the control member 19, and does not interfere with the negative half cycle of alternating potential. The negative half cycles of alternating potential are impressed upon the control member 20. During the negative half cycles the respective electric valves are maintained nonconductive. This excitation system, which is entirely electrical in its operation, provides a highly satisfactory means for controlling electric valves of the gaseous type having two or more control members in accordance with two or more different electrical conditions.

Referring now to Figs. 3a and 3b, considered conjointly, an embodiment of my invention is diagrammatically represented as applied to an electric valve converting system for transmitting energy between a three phase alternating current circuit of constant frequency and an alternating current circuit of variable frequency. A polyphase alternating current motor 43 of the synchronous type, including two electrical networks 44 and 45, each having inductive phase windings 46—48 and 49—51 and electrical neutrals 52 and 53, respectively, a rotating member 54 and a field winding 55, is energized from a three phase alternating current supply circuit 56 through electric valves 57–74, inclusive, preferably of the gaseous type. Each of these power electric valves is provided with an anode 75, a cathode 76 and control members or electrodes 77 and 78. The three groups of electric valves 57—59, 60—62, and 63—65 operate as controlled rectifiers to supply unidirectional current to the phase windings 46, 47 and 48, respectively, of motor 43 through conductors 79, 80 and 81, respectively. And the three groups of oppositely disposed valves 66—68, 69—71, and 72—74 operate as controlled rectifiers to return this unidirectional current to the supply circuit 56 through field winding 55, phase windings 49, 50 and 51 and conductors 82, 83, and 84, respectively.

To provide means for controlling the conductivity of electric valves 57—74 in accordance with an electrical condition such as the voltage of the supply circuit 56, I provide a transformer 85 having a primary 86 and secondary windings 87—92, inclusive, and a common electrical neutral 93. The transformer 85 is energized from the supply circuit 56 through any conventional phase shifting arrangement such as the rotary phase shifter 93. It will be noted that the control members 77 of valves 57—65, inclusive, are energized from a three phase source comprising secondary windings 87, 89, and 91 of transformer 85 and conductors 94, and the control members 77 of the oppositely disposed electric valves 66—74, inclusive, are energized from a three phase source comprising secondary windings 88, 90, and 92 of transformer 85 and conductors 95. These three-phase control systems are displaced relative to each other by sixty electrical degrees.

A plurality of transformers 96, each of which is associated with a different one of the electric valves 57—65, energize the control members 77 in accordance with the voltages of the three phase system comprising conductors 94; and a plurality of transformers 97, each of which is associated with a different one of the electric valves 66—74, energize the control members 77 of these valves in accordance with the voltages of the three phase system comprising conductors 95. Current limiting resistances 98 are connected in series with the control members 77 and the secondary windings of the associated transformers 96 and 97. Nonlinear resistances 99 are connected across the primary windings of transformers 96 and 97 to cause a voltage of peaked wave form to appear across the secondary windings of these transformers. One terminal of each of the primary windings of transformers 96 or transformers 97 for each group of three valves, for example, valves 57—59, is connected to a neutral connection 100 through a rectifier 101. The excitation circuit employing rectifiers connected in the circuit as are rectifiers 101 is disclosed and broadly claimed in United States Letters Patent 1,971,833, granted August 28, 1934, on application of Earl L. Phillipi and assigned to the assignee of the present application.

In order to control the conductivity of the valves 57—74 for starting the motor 43 and for operating the motor at relatively low speeds, I provide variable frequency controlling means, such as a distributor 102, which is connected to the rotor 54 of motor 43 and is provided with a brush 103 which is connected to the neutral connection 93 of transformer 85 through a conductor 104. The shaded portion of the distributor 102 represents insulation, and the neutral connection 93 of transformer 85 is connected to a conducting segment 105 of the distributor. The distributor is also provided with brushes 106—111, inclusive, which are displaced by sixty electrical degrees relative to each other. Brushes 106, 108 and 110 are connected to the neutral connections 100 for the groups of valves 63—65, 60—62 and 57—59 through conductors 112, 113 and 114 and through a switch 115. Brushes 107, 109 and 111 are connected to neutral connections 100 of the transformers 97 for the groups of valves 69—71, 66—68 and 72—74 through conductors 115', 116, and 117, respectively. The switch 115 when moved to the right connects together all the neutral connections 100 and renders the distributor 102 ineffective.

As a means for controlling the conductivity of the groups of valves 57—59, 60—62, and 63—65 in accordance with an operating condition of the motor 43, such as the speed of the rotor or the voltage of the phase windings 46—48, I employ a transformer 118 having primary windings 119 and secondary windings 120, 121 and 122 energized through any conventional phase shifting arrangement such as the rotary phase shifter 123. The phase shifter 123 is connected to the network 44 through conductors 124 and a switch 125. The control members 78 of the groups of electric valves 57—59, 60—62 and 63—65 are energized from secondary windings 120, 121 and 122, respectively, through current limiting resistances 126 and sources of biasing voltage such as batteries 126'. In a similar manner, the conductivity of each of the groups of electric valves 66—68, 69—71 and 72—74 is controlled in accordance with an operating condition of the motor 43, through transformer 127, having primary windings 128, and secondary windings 129, 130 and 131, rotary phase shifter 132 and a switch 133.

In explaining the operation of the embodiment of my invention diagrammatically shown in Figs. 3a and 3b, let it be assumed that the supply circuit 56 is energized from a source of alternating current of any frequency, preferably one of commercial frequency. Furthermore, assume that the phase of the alternating potentials impressed on the control members 77 is retarded in phase relative to the anode potentials by means of the phase shifter 93 so that the average voltage which the valves impress on the phase winding is not sufficient to cause the member 54 to rotate. Let it also be assumed that the switch 115 is moved to the left position and that the switches 125 and 133 are in the open circuit positions. Since the conductive segment 105 of distributor 102 is establishing contact with brushes 110 and 111, phase windings 46 and 51 will be energized through the groups of valves 57—59 and 72—74. As the phase of the alternating voltage impressed on control members 77 of the electric valves is advanced, the average voltage impressed on the phase windings will be increased.

Assuming that the rotary member 54 is in a torque producing position relative to the magnetomotive force established by the phase windings 46 and 51 and that the member 54 rotates in a clockwise direction, substantially sixty electrical degrees later the conducting segment 105 of distributor 102 will make contact with brush 108, commutating the current from phase winding 46 to winding 47, effecting thereby energization of phase winding 47 and producing a rotation of the magnetomotive forces incident to these phase windings. This sequential energization of the phase windings causes the rotating member 54 to continue to move in a clockwise direction. In the position last described, the distributor 102 effects energization of phase windings 47 and 51 through the groups of electric valves 60—62 and 72—74. As the phase of the alternating voltage impressed upon the control member 77 of the various electric valves is advanced relative to the respective anode voltages, the motor 43 will accelerate at a rate dependent upon the connected load. In a manner similar to that described above, the distributor 102 will effect periodic selective energization of the various phase windings 46—51 in accordance with the speed of the motor. Since the distributor has a predetermined position relative to the position of the rotating member 54, it will effect energization of only those phase windings which are in a torque producing position relative to the rotating member 54.

If it is desired to control the conductivity of electric valves 57–75, inclusive, in accordance with the electromotive force of the motor armature phase windings or terminals, the distributor 102 may be rendered ineffective by moving the switch 115 to the right position so that it is short circuited and switches 125 and 133 may be moved to the closed position, effecting thereby energization of transformers 118 and 127 in accordance with the voltage appearing across electrical networks 44 and 45, respectively. Through transformers 118 and 127, control members 78 of electric valves 57 to 74, inclusive, are energized in response to the voltage of the respective networks 44 and 45 and hence in accordance with the speed of the motor 43. It has been found that satisfactory excitation is obtained by utilizing the motor armature electromotive forces at speeds at or about half synchronous speed.

It should be understood that by the use of electric valves 57–74, inclusive, each employing control members 77 and 78, I provide an electric valve converting system for controlling the conductivity of each of these valves in accordance with an electrical condition of the supply circuit 56 and in accordance with an operating condition, such as the frequency or speed of the motor 43. The electric valves 57–74, inclusive, are of the type which may be maintained nonconductive by impressing a suitable negative potential upon either of the control members 77 and 78 and by the choice of proper potentials impressed upon these control members the conductivity of the valve may be controlled in accordance with two separate electrical conditions, thereby making it possible to dispense with elaborate and complicated auxiliary control circuits.

Although the motor 43 is structurally similar to an alternating current synchronous motor, this motor has the characteristics of a direct current series motor since by advancing the phase of the alternating potential impressed upon the control member 77 of electric valves 57 to 74, inclusive, and increasing the average voltage which these valves supply, the speed of the motor increases at a rate dependent upon the connected load.

While I have diagrammatically shown my invention as applied to an electric valve converting system for energizing variable speed, variable frequency dynamo electric machines, it should be understood that my invention in its broader aspects may be applied generally to electric translating circuits where it is desired to transmit energy between alternating and direct current circuits, or between alternating current circuits of the same or different frequencies, or between variable frequency alternating current circuits.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States, is:—

1. In combination, a supply circuit, a load circuit, and electric translating apparatus interconnecting said circuits comprising electric valve means of the gaseous type having a plurality of principal electrodes and a plurality of control members, and an excitation circuit for energizing said control members individually for controlling the initiation of an electrical discharge conjointly in accordance with electrical conditions of said supply circuit and said load circuit.

2. In combination, an alternating current supply circuit, an alternating current load circuit, electric valve frequency changing apparatus interconnecting said circuits comprising an electric valve of the gaseous type having an anode, a cathode and at least two control members for conjointly controlling the conductivity thereof and an excitation circuit for energizing said control members comprising means for impressing on one of said control members a voltage which varies in accordance with the voltage of said supply circuit and means for impressing on the other control member a voltage which varies in accordance with the voltage of said load circuit.

3. In combination, a supply circuit, a load circuit, and electric translating apparatus interconnecting said circuits comprising an inductive network, electric valve means of the gaseous type having a plurality of control members for transmitting energy between said circuits through said network and means for energizing said control members individually to control said electric valve means conjointly in accordance with electrical conditions of the respective circuits.

4. In combination, a supply circuit, a load circuit, and electric translating apparatus interconnecting said circuits comprising an inductive network, an electric valve of the gaseous type having an anode, a cathode and two control members for transmitting energy between said circuits through said network and means for energizing one of said control members in accordance with an electrical condition of said supply circuit and for energizing the other of said members in accordance with an electrical condition of said load circuit to control conjointly the conductivity of said electric valve.

5. An electric valve converting system comprising a source of alternating current, electric translating apparatus including a plurality of phase windings, a group of similarly connected valves each comprising an anode, a cathode and at least two control members interconnecting one of said phase windings and said source, a second group of electric valves each comprising an anode, a cathode and at least two control members connected oppositely to said first group and interconnecting another of said phase windings and said source, and means for energizing said control members to control conjointly the conductivity of each of said valves in accordance with a predetermined electrical condition of said source and in accordance with a predetermined electrical condition of said windings.

6. An electric valve converting system comprising a source of alternating current, electric translating apparatus including a plurality of phase windings, a plurality of electric valve means each including an anode, a cathode and at least two control members for transmitting current from said source to one of said phase windings, an interconnection between said phase windings, a plurality of electric valve means each comprising an anode, a cathode and at least two control members for returning said current from another of said phase windings to said source, and means for energizing said control members to control conjointly the conductivity of each of said electric valve means in accordance with an electrical condition of said source and in accordance with an electrical condition of said phase windings.

7. An electric valve converting system comprising an alternating current supply circuit, electric translating apparatus including a plurality of phase windings, a group of electric valves each comprising an anode, a cathode and at least two control members connected to transmit current continuously from said supply circuit to one of said windings, an interconnection between said phase windings, a second group of electric valves each comprising an anode, a cathode and at least two control members connected to return said current continuously from another of said phase windings to said supply circuit, and means for conjointly controlling the conductivity of said groups of valves through said control members in accordance with the voltage of said supply circuit and in accordance with the voltage of said phase windings.

8. In combination, an electric valve converting system comprising an alternating current supply circuit, electric translating apparatus including a plurality of phase windings, a plurality of electric valves each including an anode, a cathode and at least two control members for periodically supplying unidirectional current from said supply circuit to each of said phase windings, a plurality of electric valve means each having an anode, a cathode and at least two control members and being connected to said alternating current supply circuit in a sense opposite to that of said first-mentioned valves for returning said current to said supply circuit, and means for energizing said control members in accordance with electrical conditions of said supply circuit and said phase windings to control conjointly the conductivity of each of said electric valves to effect energization of said phase windings in a predetermined sequence.

9. An electric valve converting system comprising a polyphase alternating current supply circuit, electric translating apparatus including a plurality of inductive windings, a plurality of electric valve means each including an anode, a cathode and at least two control members for supplying current to one of said windings from one phase of said supply circuit, a connection between said windings, other electric valve means for returning said current through another of said windings to another phase of said supply circuit, and means for conjointly controlling the conductivity of each of said electric valve means through said control members in accordance with an electrical condition of said supply circuit and in accordance with an electrical condition of said inductive windings.

10. An electric valve converting system comprising an alternating current supply circuit, polyphase electric translating apparatus including a plurality of polyphase inductive networks each provided with an electrical neutral, an inductive winding interconnecting said electrical neutrals, a plurality of electric valves each comprising an anode, a cathode and at least two control members interconnecting each phase terminal of one of said networks with each terminal of said supply circuit, said valves being similarly connected with respect to said supply circuit, a plurality of electric valves each having an anode, a cathode and at least two control members and interconnecting each phase terminal of the other of said networks with each terminal of said supply circuit in a sense opposite to that of said first-mentioned valves, and means for controlling conjointly the conductivity of each of said valves through said control members in accordance with an electrical condition of said supply circuit and an electrical condition of said inductive networks.

11. An electric valve converting system comprising an alternating current supply circuit, polyphase electric translating apparatus comprising a plurality of phase windings, a plurality of electric valve means each including an anode, a cathode and at least two control members and connecting said phase windings across said source in series circuit relation, and means for controlling conjointly the conductivity of said electric valve means through said control members in accordance with predetermined electrical conditions of said supply circuit and said phase windings.

12. An electric valve frequency changing system comprising a source of alternating current, a load circuit comprising a plurality of phase windings, a group of similarly connected electric valves each having an anode, a cathode and at least two control members interconnecting one of said phase windings and said source, a second group of electric valves each having an anode, a cathode and at least two control members interconnecting another of said phase windings and said source, said second group of valves being connected oppositely to said first group with respect to said source, and means for conjointly controlling the conductivity of said valves through said control members at a variable frequency to supply variable frequency alternating current to said load circuit in accordance with an electrical condition of said load circuit.

13. An electric valve converting system comprising a source of alternating current, a dynamo electric machine provided with a plurality of phase windings, electric valve means of the gaseous type having a plurality of control members and connected selectively to energize said phase windings from said source, and means for energizing said control members individually for conjointly controlling the conductivity of said electric valve means in accordance with an electrical condition of said source and in accordance with an operating condition of said machine.

14. An electric valve converting system comprising a source of alternating current, a dynamo-electric machine provided with a plurality of phase windings, a group of similarly connected electric valves each having an anode, a cathode and at least two control members interconnecting one of said phase windings and said source, an interconnection between said phase windings, a second group of electric valves each having an anode, a cathode and at least two control members interconnecting another of said phase windings and said source, said second group of valves being connected oppositely to said first group with respect to said source, and means for conjointly controlling the conductivity of each of said valves through said control members at a variable frequency to vary the speed of said machine.

15. In combination, an alternating current supply circuit, an alternating current dynamo-electric machine provided with a pair of inductive networks and each having an electrical neutral, an interconnection between said electrical neutrals, a plurality of electric valves each having an anode, a cathode and at least two control members for controlling the conductivity of said valves connecting one network to said supply circuit, a plurality of electric valves each having an anode, a cathode and two control members for controlling the conductivity of said valves and being oppositely disposed relative to said supply circuit for connecting the other of said networks to said supply circuit, and means for impressing upon the control members of each of said electric valves potentials for controlling conjointly the conductivity of each of said valves in accordance with an electrical condition of said supply circuit and in accordance with an operating condition of said machine.

16. An electric valve converting system comprising a source of alternating current, a dynamo-electric machine provided with a plurality of phase windings, a plurality of electric valves each including an anode, a cathode and at least two control members for controlling the conductivity of said valves and interconnecting said phase windings and said source, and means for energizing said control members of said valves to control conjointly each of said electric valves to supply unidirectional current from said supply circuit to said phase windings and to commutate said current between said phase windings in accordance with an operating condition of said machine.

17. In combination, an alternating current supply circuit, electric translating apparatus including a plurality of electric valves each having an anode, a cathode and at least two control members interconnecting said supply circuit and said apparatus, and a plurality of excitation circuits each associated with a predetermined one of said electric valves for controlling the conductivity of said associated electric valve comprising means for energizing one of said control members in accordance with an electrical condition of said supply circuit and means for energizing the other of said control members in accordance with an operating condition of said translating apparatus.

18. In combination, an alternating current supply circuit, electric translating apparatus including a plurality of electric valves each having an anode, a cathode and at least two control members for interconnecting said supply circuit and said apparatus, and a plurality of excitation circuits each associated with a predetermined one of said electric valves for controlling the conductivity of said associated electric valve comprising means for energizing one of said control members in accordance with an electrical condition of said supply circuit, variable frequency means for periodically controlling the energization of said control member in accordance with an operating condition of said translating apparatus, and means for energizing the other of said control members of each of said electric valves in accordance with an operating condition of said supply circuit.

19. In combination, an alternating current supply circuit, electric translating apparatus including a plurality of electric valves each having an anode, a cathode and two control members for conjointly controlling the conductivity of each of said valves and interconnecting said supply circuit and said apparatus, and an excitation circuit associated with each of said electric valves comprising means for energizing one of said control members of each of said valves in accordance with an electrical condition of said supply circuit, a distributor for controlling the energization of one of said control members of each of said valves in accordance with an operating condition of said translating apparatus and means for energizing the other of said control members in accordance with said operating condition of said translating apparatus.

20. In combination, an alternating current supply circuit, electric translating apparatus including a plurality of electric valves each having an anode, a cathode and two control members for interconnecting said supply circuit and said translating apparatus, and a plurality of excitation circuits each associated with a predetermined one of said electric valves comprising means for impressing on one of said control members of each of said valves a potential which varies in accordance with an electrical condition of said supply circuit, means for impressing upon the other of said control members a potential which varies in accordance with an operating condition of said translating apparatus and means for varying the phase of the potential impressed upon said first-mentioned control members to control said operating condition of said translating apparatus.

21. In combination, an alternating current supply circuit, a dynamo-electric machine having a plurality of phase windings, a plurality of electric valves each having an anode, a cathode and two control members for selectively energizing said phase windings in accordance with an operating condition of said machine, and a plurality of excitation circuits each associated with a predetermined one of said electric valves comprising means for energizing one of said control members of each of said electric valves in accordance with an electrical condition of said supply circuit, a distributor for controlling the energization of said one of said control members of each of said valves in accordance with an operating condition of said machine and means for controlling the energization of the other of said control members in accordance with the voltage of said phase windings.

22. In combination, an alternating current supply circuit, a dynamo-electric machine having a plurality of phase windings, a plurality of electric valves each having an anode, a cathode and two control members for selectively energizing said phase windings in accordance with an operating condition of said machine, a distributor for effecting periodic energization of each of said electric valves to effect said selective energization of said phase windings, means for impressing upon one of said control members through said distributor a voltage which varies in accordance with an electrical condition of said supply circuit and which varies in accordance with an operating condition of said machine, means for impressing upon the other of said control members a potential which varies in accordance with an operating condition of said machine, and means for rendering said distributor ineffective.

23. The method of transmitting energy between alternating current circuits through translating apparatus including an electric valve of the gaseous type having an anode, a cathode and two control members for jointly controlling the conductivity of said valve which comprises energizing one of said control members in accordance with an electrical condition of one of said circuits, and energizing the other of said control members in accordance with an electrical condition of the other of said circuits.

24. The method of operating a dynamo-electric machine provided with a plurality of armature windings and associated terminals from a source of alternating current through a plurality of electric valves of the gaseous type having an anode, a cathode and two control members for jointly controlling the conductivity of said valves which comprises energizing one of said control members of each of said valves in accordance with an alternating potential of said source, and energizing the other of said control members in accordance with an operating condition of said machine.

25. The method of operating a motor provided with a field winding and a plurality of armature windings and associated terminals from a source of alternating current through a plurality of electric valves each having an anode, a cathode and two control members for jointly controlling the conductivity of said valves which comprises applying to one control member of each of said valves an alternating potential which varies in accordance with the voltage of said source, applying an alternating potential to the other control member of each of said valves associated with the terminal of an armature winding in torque producing position, and successively transferring said alternating potential to the other control members of valves associated with successive armature terminals when the field winding moves into torque producing position relative to the associated armature windings.

26. In an excitation circuit for an electric valve of the gaseous type having an anode, a cathode and two control members the combination of a source of alternating potential for energizing one of the control members, a second source of alternating potential for energizing the other of said control members and means comprising a unidirectional conducting device connected across said second source for suppressing the positive half-cycles of potential to maintain said valve non-conductive during the negative half-cycles of the potential of said second source and for permitting said one of said control members to render said valve conductive only during the positive half-cycles of potential of said second source.

27. In combination, a supply circuit, a load circuit, electric valve translating apparatus interconnecting said circuits comprising an electric valve of the gaseous type having an anode, a cathode and two control members, and an excitation circuit for controlling the conductivity of said electric valve in accordance with two different predetermined electrical conditions comprising means for impressing on one of said control members a potential which varies in accordance with one of said electrical conditions and means including a unidirectional conducting device connected across said cathode and the other of said control members for impressing only negative potentials on the other of said control members to maintain said valve non-conductive during predetermined intervals in accordance with the other of said electrical conditions.

ERNST F. W. ALEXANDERSON.